United States Patent
Zaifman et al.

(10) Patent No.: US 11,411,935 B2
(45) Date of Patent: Aug. 9, 2022

(54) EXTRACTING DATA FROM ENCRYPTED PACKET FLOWS

(71) Applicant: AT&T Intellectual Property I, L.P., Atlanta, GA (US)

(72) Inventors: Arthur L. Zaifman, Millburn, NJ (US); John M. Mocenigo, Califon, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 184 days.

(21) Appl. No.: 16/820,039

(22) Filed: Mar. 16, 2020

(65) Prior Publication Data

US 2020/0220849 A1 Jul. 9, 2020

Related U.S. Application Data

(62) Division of application No. 15/457,306, filed on Mar. 13, 2017, now Pat. No. 10,594,664.

(51) Int. Cl.
*H04L 9/40* (2022.01)

(52) U.S. Cl.
CPC ...... *H04L 63/0428* (2013.01); *H04L 63/0823* (2013.01); *H04L 63/30* (2013.01); *H04L 63/1408* (2013.01); *H04L 63/166* (2013.01)

(58) Field of Classification Search
CPC . H04L 63/0428; H04L 63/0823; H04L 63/30; H04L 63/1408; H04L 63/166
See application file for complete search history.

(56) References Cited

U.S. PATENT DOCUMENTS 7,415,723 B2  8/2008  Pandya
7,478,420 B2  1/2009  Wright et al.
(Continued)

FOREIGN PATENT DOCUMENTS

EP   1665818 A2   1/2012
WO   0197427 A1   12/2001
WO   2006012610 A2   3/2006

OTHER PUBLICATIONS

Craig Partridge et al., "Using signal processing to analyze wireless data traffic." Proceedings of the 1st ACM workshop on Wireless security. ACM, Sep. 28, 2092. http://citeseerx.ist.psu.edu/viewdoc/download?doi=10.1.1.13.9713&rep=rep1&type=pdf.
(Continued)

*Primary Examiner* — Henry Tsang

(57) ABSTRACT

In one example, the present disclosure describes a device, computer-readable medium, and method for extracting data from encrypted packet flows. For instance, in one example, a method includes detecting a data packet that belongs to an encrypted data flow traversing a network, determining whether the encrypted data flow is a new encrypted data flow or an existing encrypted data flow, based on an inspection of payloads of data packets belonging to the encrypted data flow for evidence of a transport control protocol handshake, forwarding the data packet to a first server pool that will truncate the data packet, when the encrypted data flow is an existing encrypted data flow, and forwarding the data packet to a second server pool that will inspect a payload of the data packet for a secure sockets layer certificate, when the encrypted data flow is a new encrypted data flow.

20 Claims, 3 Drawing Sheets

(56) References Cited

U.S. PATENT DOCUMENTS

| | | | |
|---|---|---|---|
| 7,681,032 | B2 | 3/2010 | Peled et al. |
| 7,685,254 | B2 | 3/2010 | Pandya |
| 7,685,436 | B2 | 3/2010 | Davis et al. |
| 7,778,194 | B1* | 8/2010 | Yung .................. H04L 47/10 370/252 |
| 8,135,657 | B2 | 3/2012 | Kapoor et al. |
| 8,341,724 | B1* | 12/2012 | Burns .................. H04L 63/145 726/13 |
| 8,633,706 | B2 | 1/2014 | Liu |
| 8,707,440 | B2 | 4/2014 | Gula et al. |
| 9,077,692 | B1 | 7/2015 | Burns et al. |
| 9,119,109 | B1 | 8/2015 | Dubrovsky et al. |
| 9,270,559 | B2 | 2/2016 | Raleigh et al. |
| 9,313,232 | B2 | 4/2016 | Ahuja et al. |
| 9,532,161 | B2 | 12/2016 | Raleigh |
| 2003/0051026 | A1 | 3/2003 | Carter et al. |
| 2004/0259640 | A1 | 12/2004 | Gentles et al. |
| 2005/0210243 | A1* | 9/2005 | Archard .............. H04L 63/0428 713/160 |
| 2010/0135323 | A1* | 6/2010 | Leong .................. H04L 69/04 370/474 |
| 2012/0130903 | A1 | 5/2012 | Dorsey et al. |
| 2013/0268357 | A1 | 10/2013 | Heath |
| 2014/0149294 | A1 | 5/2014 | Leevendig et al. |
| 2016/0182333 | A1 | 6/2016 | Pedersen |
| 2016/0219024 | A1 | 7/2016 | Verzun et al. |
| 2016/0294987 | A1 | 10/2016 | Tian et al. |
| 2016/0366155 | A1 | 12/2016 | El-moussa et al. |
| 2017/0013000 | A1* | 1/2017 | El-Moussa .......... H04L 63/1408 |
| 2017/0048698 | A1 | 2/2017 | Choffnes et al. |
| 2017/0187733 | A1* | 6/2017 | Ahn ........................ H04L 63/20 |

OTHER PUBLICATIONS

David Cousins et al., "Understanding encrypted networks through signal and systems analysis of traffic timing." Proc. 2003 IEEE Aerospace Conference. Mar. 8, 2003, http://ftp.caida.org/workshops/isma/0411/readings/ismacousins.pdf.

Susie J. Wee et al., "Secure scalable streaming enabling transcoding without decryption." Image Processing. 2001. Proceedings. 2001 International Conference on. vol. 1. IEEE, Oct. 7, 2001. http://shiftleft.com/mirrors/www.hpl.hp.com/techreports/2001/HPL2001320.pdf.

Laurent Bernaille et al., "Early recognition of encrypted applications." International Conference on Passive and Active Network Measurement. Springer Berlin Heidelberg, Apr. 5, 2007. https://hal.inria.fr/hal-01097656/document.

Charles V. Wright et al., "Language identification of encrypted voip traffic: Alejandra y roberto or alice and bob?." USENIX Security. vol. 3. No. 3.6. Aug. 6, 2007. http://static.usenix.org/events/sec07/tech/full_papers/wright/wright_html/.

* cited by examiner

EXTRACTING DATA FROM ENCRYPTED PACKET FLOWS

This application is a divisional of U.S. patent application Ser. No. 15/457,306, filed Mar. 13, 2017, now U.S. Pat. No. 10,594,664, which is herein incorporated by reference in its entirety.

The present disclosure relates generally to data mining, and relates more particularly to devices, non-transitory computer-readable media, and methods for extracting useful data from encrypted packet flows.

BACKGROUND

Data mining has become a valuable tool for helping network service providers to analyze and understand their customers' service-related needs. For instance, information can be extracted from a data set (e.g., a set of packets exchanged between network endpoints) and transformed into a structure that can be analyzed for the occurrence of patterns, relationships, and other statistics that indicate how the customers are using the network.

SUMMARY

In one example, the present disclosure describes a device, computer-readable medium, and method for extracting data from encrypted packet flows. For instance, in one example, a method includes detecting a data packet that belongs to an encrypted data flow traversing a network, determining whether the encrypted data flow is a new encrypted data flow or an existing encrypted data flow, based on an inspection of payloads of data packets belonging to the encrypted data flow for evidence of a transport control protocol handshake, forwarding the data packet to a first server pool that will truncate the data packet, when the encrypted data flow is an existing encrypted data flow, and forwarding the data packet to a second server pool that will inspect a payload of the data packet for a secure sockets layer certificate, when the encrypted data flow is a new encrypted data flow.

In another example, a device includes a processor and a computer-readable medium storing instructions which, when executed by the processor, cause the processor to perform operations. The operations include detecting a data packet that belongs to an encrypted data flow traversing a network, determining whether the encrypted data flow is a new encrypted data flow or an existing encrypted data flow, based on an inspection of payloads of data packets belonging to the encrypted data flow for evidence of a transport control protocol handshake, forwarding the data packet to a first server pool that will truncate the data packet, when the encrypted data flow is an existing encrypted data flow, and forwarding the data packet to a second server pool that will inspect a payload of the data packet for a secure sockets layer certificate, when the encrypted data flow is a new encrypted data flow.

In another example, a method includes inspecting payloads of data packets belonging to a new encrypted data flow for a secure sockets layer certificate, wherein evidence of a transport control protocol handshake has been previously detected in the new encrypted data flow, detecting the secure sockets layer certificate in a payload of one of the data packets, and extracting the secure sockets layer certificate from the payload of the one of the data packets.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure extracts data from encrypted packet flows. As discussed above, data mining has become a valuable tool for helping network service providers to analyze and understand their customers' service-related needs. Network traffic can be analyzed for patterns, relationships, and other statistics that indicate how the customers are using the network. However, as more and more data packets are encrypted prior to traversing the network, it becomes more difficult to extract enough information from the network traffic to enable a meaningful analysis.

Examples of the present disclosure provide a way of extracting data from encrypted packet flows. In one example, packet flows traversing the network are replicated, and the replica or "mirrored" versions of the original packets are subsequently analyzed by one or more servers. In some examples, the headers of the replica packets are scanned for a port number indicating the use of a secure communication channel (e.g., a channel that encrypts the data packets). Replica packets whose headers contain this port number may be subsequently analyzed by a multiplexer to determine whether they belong to an existing encrypted packet flow or a new encrypted packet flow, based on the detection of a transport control protocol (TCP) handshake in the payload. All replica packets may be truncated by a first pool of servers (e.g., the payloads may be discarded). Replica packets that belong to new encrypted packet flows may also be forwarded to a second pool of servers that will inspect the payloads and detect when a Secure Sockets Layer (SSL) certificate is exchanged. Because the SSL certificate is exchanged in the clear, useful information may be extracted from it. Moreover, the number of payloads that need to be inspected in order to extract the SSL certificate is minimized.

Figure 1:
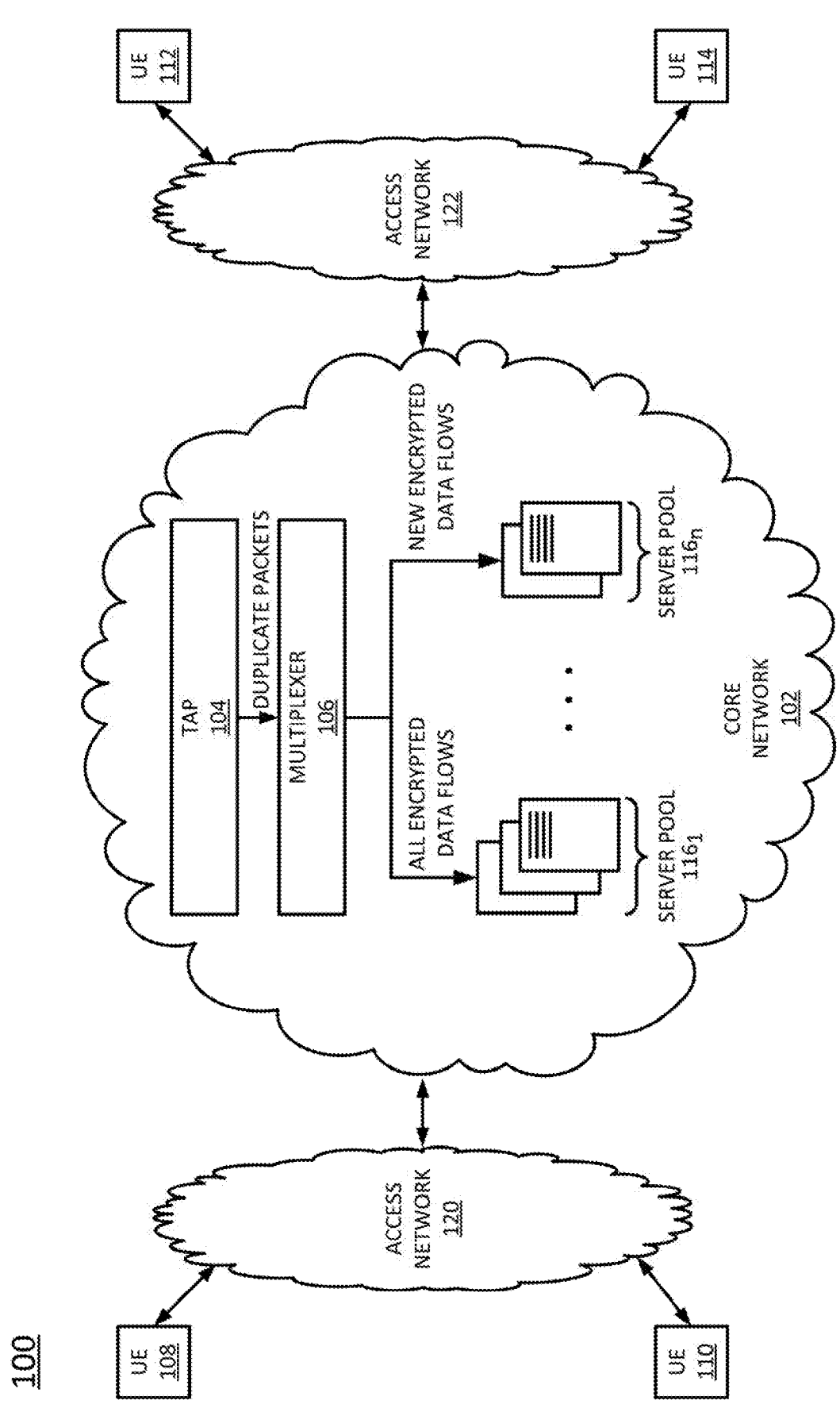
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include a traffic analysis point (TAP) 104, a multiplexer 106, and a plurality of server pools $116_1$-$116_n$ (hereinafter collectively referred to as "server pools 116"). Although only a single TAP 104, a single multiplexer 106, and n server pools 116 are illustrated, it should be noted that any number of TAPs, multiplexers, and server pools may be deployed. Furthermore, for ease of illustration, various additional elements of core network 102 are omitted from FIG. 1, including switches, routers, firewalls, application servers, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 124 and core network 102 relating to communications with web servers, TAP 104, and/or other servers via the Internet and/or other networks, and so forth.

In one embodiment, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

In one embodiment, the TAP 104 is configured to mirror or replicate all data packets traversing the core network 102 and to send the replica data packets to the multiplexer 106. In one example, the TAP 104 is an optical TAP that mirrors the data packets in a manner that is transparent to the UEs 108, 110, 112, and 114 (i.e., without noticeably disrupting the network activity).

The multiplexer 106 scans the header of each replica packet and determines whether it belongs to an encrypted data flow based on whether a field of the header contains a value that indicates the use of a secure communication channel. For instance, the value may be a value in the port number field, such as port number 443, which is the default transmission control protocol (TCP) port that is used for websites which use the SSL protocol. Additionally, the multiplexer may determine whether a replica packet that belongs to an encrypted data flow belongs to an existing encrypted data flow (i.e., a data flow whose packets are already encrypted using an SSL certificate) or a new encrypted data flow (i.e., a data flow whose packets are about to be encrypted using an SSL certificate). This determination may be made by examining the payloads of the replica data packets for evidence of a TCP handshake, which is a preliminary step in establishing a secure communication channel. If evidence of a TCP handshake is found, this may indicate that the data flow associated with the replica data packet is about to be encrypted (i.e., will become a new encrypted data flow).

The multiplexer 106 may direct a replica data packet that belongs to an encrypted data flow to one of the server pools 116 based on whether the replica data packet belongs to an existing encrypted data flow or a new encrypted data flow. In one example, all replica data packets that belong to encrypted data flows (i.e., existing and new) are forwarded to a first server pool (e.g., server pool $116_1$). Only replica data packets that belong to new encrypted data flows are forwarded to a second server pool (e.g., server pool $116_n$).

As discussed above, different server pools 116 process different subsets of the replica data packets. In one example, a first server pool (e.g., server pool $116_1$) processes all replica data packets that have been determined to belong to encrypted data flows (i.e., existing and new encrypted data flows). However, a second server pool (e.g., server pool $116_n$) processes only replica data packets that belong to new encrypted data flows. The first server pool truncates the replica data packets that it receives (i.e., discards the payloads) and then processes or forwards them as dictated by the information in their headers. The second server pool, by contrast, inspects the payloads of the replica data packets that it receives for an SSL certificate. As discussed above, evidence of a TCP handshake (i.e., SYN/SYN-ACK/ACK) in the payload of a replica data packet of a data flow may indicate that the data flow is about to be encrypted. Thus, an SSL certificate may be exchanged shortly after the TCP handshake occurs. As such, the multiplexer 106 and/or servers in the second server pool may be able to estimate approximately when to expect to see an SSL certificate, and may inspect the payload of every replica data packet of the data flow in question until the SSL certificate is detected. Once detected, a server in the second server pool may extract the SSL certificate and either extract information from the SSL certificate or forward the SSL certificate to another server or machine that will extract the information.

In one example, the core network may further include a database (not shown) for storing information extracted from the SSL certificates.

Figure 4:
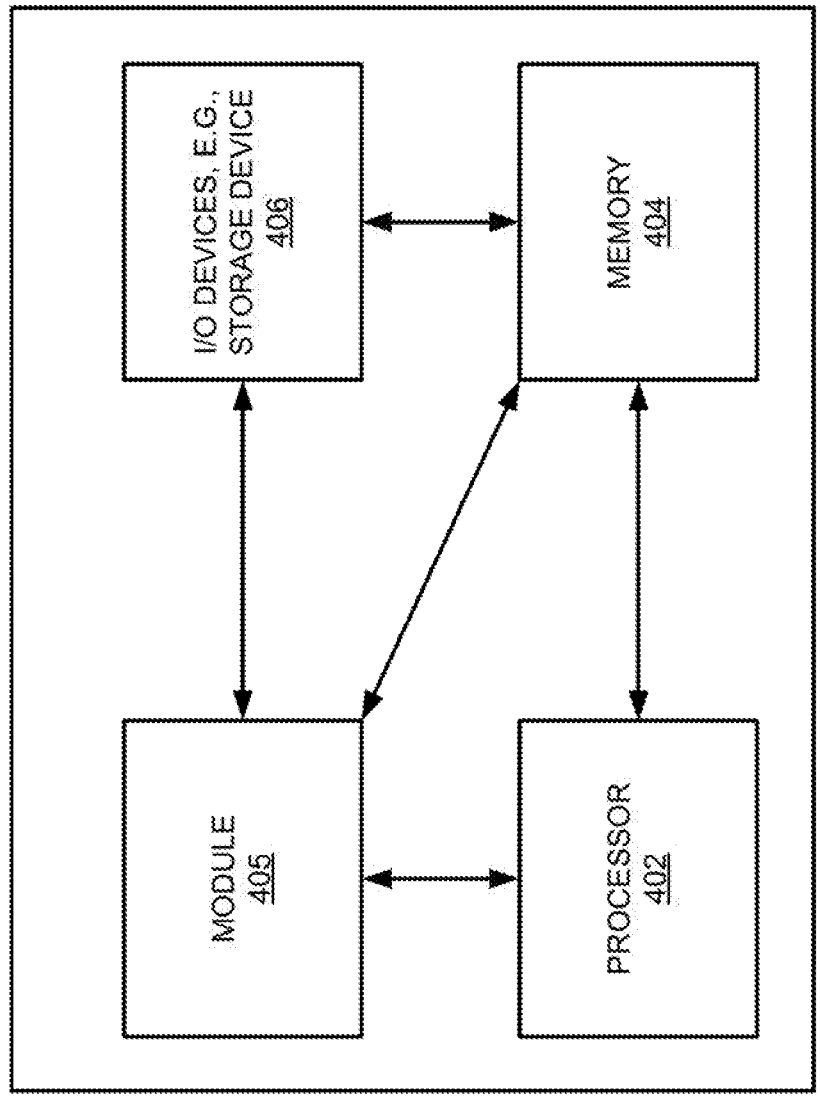
FIG. 4 depicts a high-level block diagram of a computing device specifically programmed to perform the functions described herein.

Any one or more of the TAP 104, multiplexer 106, or servers in the server pools 116 may comprise or be configured as a general purpose computer as illustrated in FIG. 4 and discussed below. It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
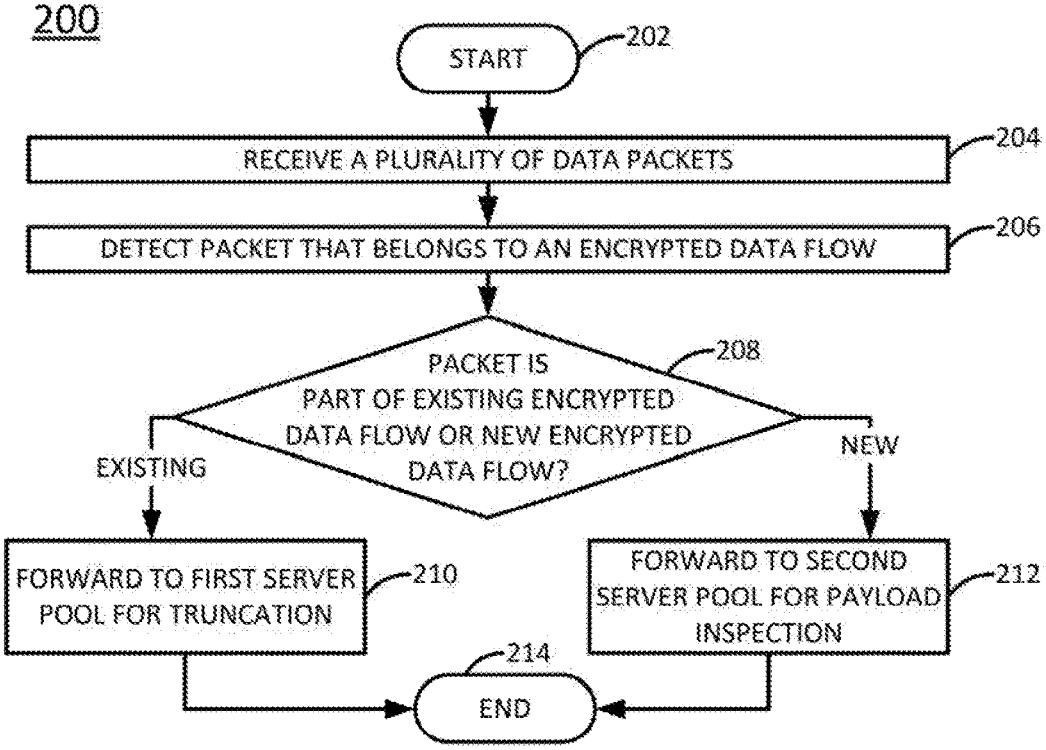
FIG. 2 illustrates a flowchart of a first example method for extracting data from encrypted packet flows in accordance with the present disclosure.

To further aid in understanding the present disclosure, FIG. 2 illustrates a flowchart of a first example method 200 for extracting data from encrypted packet flows. In one example, the method 200 may be performed by a multiplexer, e.g., multiplexer 106 illustrated in FIG. 1. However, in other examples, the method 200 may be performed by another device. As such, any references in the discussion of the method 200 to the multiplexer 106 of FIG. 1 are not intended to limit the means by which the method 200 may be performed.

The method 200 begins in step 202. In step 204, the multiplexer 106 receives a plurality of data packets, e.g., from the TAP 104. In one example, the plurality of data packets comprises data packets that are replicas of data packets exchanged by various user endpoint devices in a communication network (e.g., UEs 108, 110, 112, and 114 of the network 100).

In step 206, the multiplexer detects data packets in the plurality of data packets that belong to encrypted data flows. In one example, the multiplexer scans the headers of the data packets for values that indicate that the data packets belong to encrypted data flows. For example, if the port number field of a data packet's header contains the value "443," this indicates that the data packet belongs to an encrypted data flow, because port 443 is the default TCP port that is used for websites which use SSL.

In step 208, the multiplexer determines whether a data packet that has been determined to belong to an encrypted data flow in step 206 belongs to an existing encrypted data flow (i.e., a data flow whose packets are already encrypted using an SSL certificate) or a new encrypted data flow (i.e., a data flow whose packets are about to be encrypted using an SSL certificate). In one example, a new encrypted data flow is identified by examining the payload of a data packet for evidence of a TCP handshake (i.e., SYN/SYN-ACK/ACK). The occurrence of a TCP handshake may indicate that an SSL certificate will be exchanged imminently.

In step 210, the multiplexer forwards all of the data packets that belong to encrypted data flows to a first server pool, e.g., server pool $116_1$ of FIG. 1. The servers in the first server pool will truncate all data packets that they receive. In one example, this means that the payloads of the received data packets will be discarded.

In step 212, the multiplexer forwards all of the data packets that belong to new encrypted data flows to a second server pool different from the first server pool, e.g., server pool $116_n$ of FIG. 1. The servers in the second server pool will inspect the payloads of all data packets that they receive for the transmission of an SSL certificate, for example as discussed below in connection with FIG. 3.

The method 200 ends in step 214.

Figure 3:
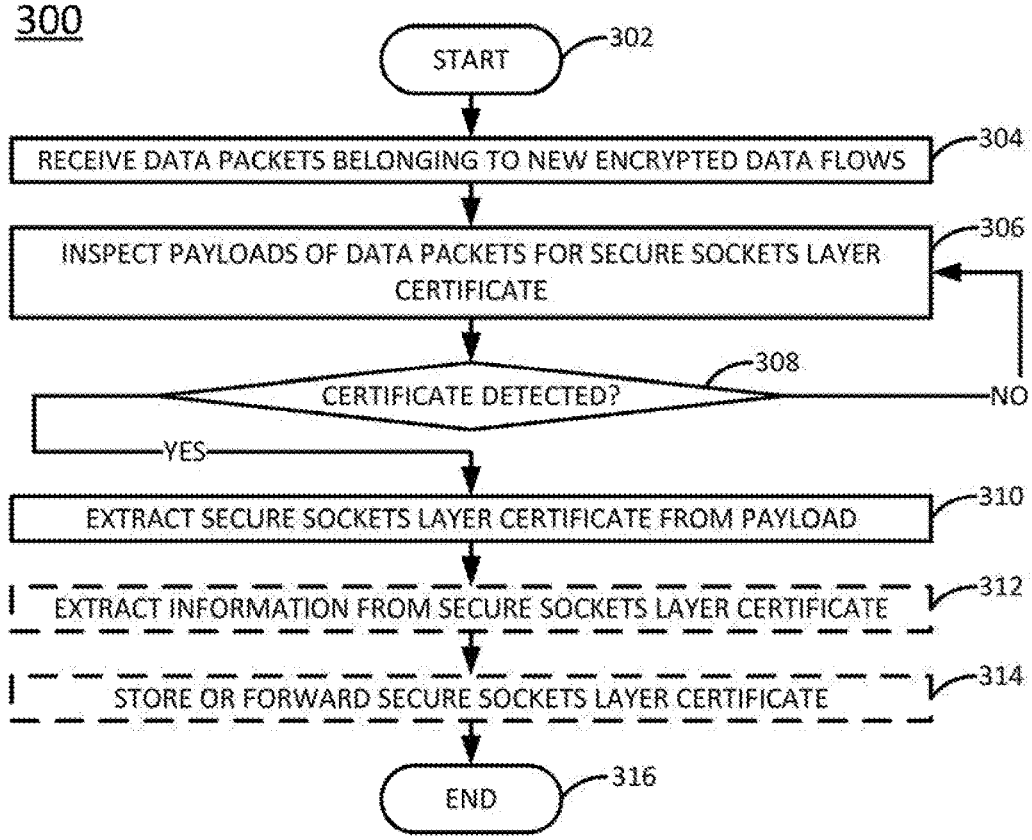
FIG. 3 illustrates a flowchart of a second example method for extracting data from encrypted packet flows in accordance with the present disclosure.

FIG. 3 illustrates a flowchart of a second example method 300 for extracting data from encrypted packet flows. In one example, the method 300 may be performed by a server of a server pool configured to inspect data packets that belong to new encrypted data flows, such as a server that belongs to the server pool $116_1$ illustrated in FIG. 1. However, in other examples, the method 300 may be performed by another device. As such, any references in the discussion of the method 300 to the server pool $116_1$ of FIG. 1 are not intended to limit the means by which the method 300 may be performed.

The method 300 begins in step 302. In step 304, the server receives data packets that have been determined (e.g., by multiplexer 106) to belong to new encrypted data flows. For example, the data packets may belong to data flows whose packets contained evidence of a TCP handshake.

In step 306, the server inspects the payloads of the data packets for an SSL certificate. As discussed above, the occurrence of a TCP handshake is one of the first steps in establishing a new encrypted data flow. As such, a TCP handshake may indicate that an SSL certificate will be exchanged imminently between user endpoint devices.

In step 308, the server determines whether an SSL certificate has been detected. If the server concludes in step 308 that an SSL certificate has not been detected, then the method 300 returns to step 306 and continues to inspect the payloads of incoming data packets.

If, however, the server concludes in step 308 that an SSL certificate has been detected, then the method 300 proceeds to step 310. In step 310, the server extracts the SSL certificate from the payload. From then on, the server may ignore the associated encrypted data flow (e.g., not inspect the payloads of subsequent data packets belonging to the encrypted data flow). By ignoring the subsequent data packets, the server essentially de-allocates some of the resources that were dedicated to the new encrypted data flow.

In optional step 312 (illustrated in phantom), the server extracts information from the SSL certificate. Information extracted from an SSL certificate may include, for example, the certificate holder's identity (e.g., company name and/or uniform resource locator), the certificate's serial number, the certificate's expiration date, a copy of the certificate holder's public key, and/or the digital signature of the certificate-issuing authority. The server may subsequently store the extracted information (e.g., in a database in the core network 102) or forward the extracted information to another device for further analysis.

In optional step 314 (illustrated in phantom), the server stores or forwards the SSL certificate to another device for extraction of information and/or further analysis.

The method 300 ends in step 316.

Thus, in some examples, the present disclosure inspects the payloads of every replica packet in a particular data flow only when it is determined that an SSL certificate will be exchanged imminently. Thus, the number of payloads to be inspected is minimized. Moreover, by detecting the exchange of the SSL certificate, which is transmitted in the clear, information about subsequently encrypted new data flows can be extracted from the SSL certificate.

In further examples, the server may ignore a particular new encrypted data flow after a configurable, predefined number of packets are examined without finding the SSL certificate. For instance, if the server has examined the payloads of x data packets belonging to the new encrypted data flow, and no SSL certificate has been detected, then the server may de-allocate some of the resources that were dedicated to the new encrypted data flow.

In some cases, the multiplexer 106 may not be configured to distinguish between existing encrypted data flows and new encrypted data flows. In this case, the payloads of all data packets that are determined to belong to encrypted data flows (e.g., based on the port numbers in the headers) may be inspected for SSL certificates. However, this increases the number of data packets whose payloads must be inspected, and thus increases the overall overhead of the system.

Although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, multiplexer (such as might be used to perform the method 200) or a server (such as might be used to perform the method 300) could be implemented as illustrated in FIG. 4.

As depicted in FIG. 4, the system 400 comprises a hardware processor element 402, a memory 404, a module 405 for extracting data from encrypted packet flows, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for extracting data from encrypted packet flows may include circuitry and/or logic for performing special purpose functions relating to data mining. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for extracting data from encrypted packet flows (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for extracting data from encrypted packet flows (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
inspecting, by a processor, payloads of data packets belonging to a new encrypted data flow for a secure sockets layer certificate, wherein evidence of a transport control protocol handshake has been previously detected in the new encrypted data flow by a first device that forwards only data packets belonging to new encrypted data flows to the processor and forwards only data packets belonging to existing encrypted data flows to a different processor;
detecting, by the processor, the secure sockets layer certificate in a payload of one of the data packets that has been inspected; and
extracting, by the processor, the secure sockets layer certificate from the payload of the one of the data packets.

2. The method of claim 1, further comprising:
ignoring future data packets of the new encrypted data flow subsequent to the detecting.

3. The method of claim 1, further comprising:
extracting information from the secure sockets layer certificate.

4. The method of claim 3, wherein the information includes an identity of a holder of the secure sockets layer certificate.

5. The method of claim 3, wherein the information includes a serial number of the secure sockets layer certificate.

6. The method of claim 3, wherein the information includes an expiration date of the secure sockets layer certificate.

7. The method of claim 3, wherein the information includes a copy of a public key belonging to a holder of the secure sockets layer certificate.

8. The method of claim 3, wherein the information includes a digital signature of an authority who issued the secure sockets layer certificate.

9. The method of claim 1, further comprising:
forwarding the secure sockets layer certificate to a device for extraction of information.

10. The method of claim 1, wherein the first device comprises a multiplexer.

11. The method of claim 1, wherein the processor belongs to a first server pool comprising a first plurality of servers, and the different processor belongs to a second server pool comprising a second plurality of servers.

12. A non-transitory computer-readable medium storing instructions which, when executed by a processor, cause the processor to perform operations, the operations comprising:
inspecting payloads of data packets belonging to a new encrypted data flow for a secure sockets layer certificate, wherein evidence of a transport control protocol handshake has been previously detected in the new encrypted data flow by a first device that forwards only data packets belonging to new encrypted data flows to the processor and forwards only data packets belonging to existing encrypted data flows to a different processor;
detecting the secure sockets layer certificate in a payload of one of the data packets that has been inspected; and
extracting the secure sockets layer certificate from the payload of the one of the data packets.

13. The non-transitory computer-readable medium of claim 12, the operations further comprising:
ignoring future data packets of the new encrypted data flow subsequent to the detecting.

14. The non-transitory computer-readable medium of claim 12, the operations further comprising:
extracting information from the secure sockets layer certificate.

15. The non-transitory computer-readable medium of claim 14, wherein the information includes an identity of a holder of the secure sockets layer certificate.

16. The non-transitory computer-readable medium of claim 14, wherein the information includes a serial number of the secure sockets layer certificate.

17. The non-transitory computer-readable medium of claim 14, wherein the information includes an expiration date of the secure sockets layer certificate.

18. The non-transitory computer-readable medium of claim 14, wherein the information includes a copy of a public key belonging to a holder of the secure sockets layer certificate.

19. The non-transitory computer-readable medium of claim 14, wherein the information includes a digital signature of an authority who issued the secure sockets layer certificate.

20. A device comprising:
a processor; and
a non-transitory computer-readable medium storing instructions which, when executed by the processor, cause the processor to perform operations, the operations comprising:
inspecting payloads of data packets belonging to a new encrypted data flow for a secure sockets layer certificate, wherein evidence of a transport control protocol handshake has been previously detected in the new encrypted data flow by a first device that forwards only data packets belonging to new encrypted data flows to the processor and forwards only data packets belonging to existing encrypted data flows to a different processor;
detecting the secure sockets layer certificate in a payload of one of the data packets that has been inspected; and
extracting the secure sockets layer certificate from the payload of the one of the data packets.

* * * * *